Inventor
CLARENCE JOHNSON
By Raymond W. Jenkins
Attorney

Inventor
CLARENCE JOHNSON
By Raymond W. Jenkins
Attorney

Jan. 20, 1948.   C. JOHNSON   2,434,853
MACHINE TOOL CONTROL
Original Filed March 20, 1941    4 Sheets-Sheet 3

Inventor
CLARENCE JOHNSON
By Raymond D. Jenkins
Attorney

Jan. 20, 1948.                C. JOHNSON                 2,434,853
                          MACHINE TOOL CONTROL
            Original Filed March 20, 1941    4 Sheets-Sheet 4

Inventor
CLARENCE JOHNSON
By Raymond W. Jenkins
Attorney

Patented Jan. 20, 1948

2,434,853

UNITED STATES PATENT OFFICE 2,434,853

MACHINE TOOL CONTROL

Clarence Johnson, South Euclid, Ohio, assignor to Bailey Meter Company, a corporation of Delaware Original application March 20, 1941, Serial No. 384,375, now Patent No. 2,372,426, dated March 27, 1945. Divided and this application April 18, 1944, Serial No. 531,549

7 Claims. (Cl. 90—62)

1

This invention relates to duplicators for controlling the operation of a machine tool so that it forms a work piece to a contour or configuration determined by a template, pattern, or cam.

One of the objects of my invention is to improve the sensitivity of duplicators of the type described, and thereby increase the accuracy with which the work piece is formed.

A further object of my invention is to provide a duplicator of materially simpler construction than those now available.

A further object of my invention is to provide a duplicator employing no moving parts in the feeler mechanism scanning the template, pattern or cam.

In accordance with my invention the template, pattern or cam for producing the desired configuration of the work piece is scanned by a jet of fluid issuing from a nozzle, so that variations in the shape of the template, pattern or cam cause corresponding changes in the rate at which fluid is discharged from the nozzle, which changes in turn control the relative movement of the tool and work piece.

Further, in accordance with my invention the changes in the rate at which fluid is discharged from the nozzle effect corresponding variations in the pressure of the fluid in the nozzle, which latter variations are used to control the relative positioning of the tool and work piece.

Further, in accordance with my invention the changes in fluid pressure control the relative positioning of the tool and work piece through a hydraulic relay and servomotor, to the end that ample power is available for accurately positioning the tool relative to the work piece.

Further, in accordance with my invention the relative rates of movement between the tool and work piece in two directions are simultaneously controlled, so that the rate of feed of the tool remains substantially constant regardless of changes in contour of the template, pattern or cam.

Further, in accordance with my invention separate and independent means are provided for controlling the rate of relative movement between tool and work piece in each direction.

Obviously, a duplicator of the type forming the subject matter of my invention may be employed with machine tools of various types, such as milling machines, lathes, slotters, planners, die-sinking machines and the like in which the relative feed between the tool and work may be suitably controlled. By way of example I will illustrate and describe my invention as applied to lathes. Further applications and modifications of the invention will be readily apparent.

Figure 1:
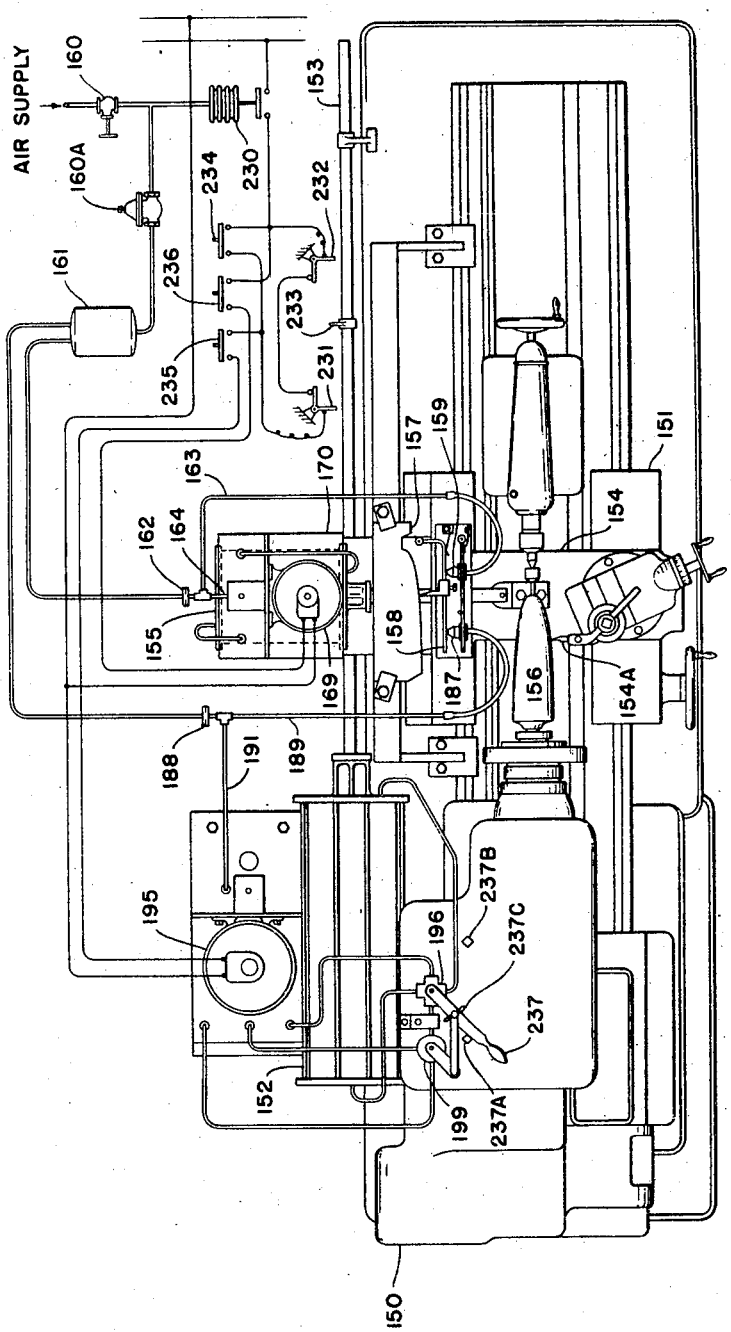
Fig. 1 is a plan view of an engine lathe illustrating the application of a form of my invention thereto.
Figure 2:
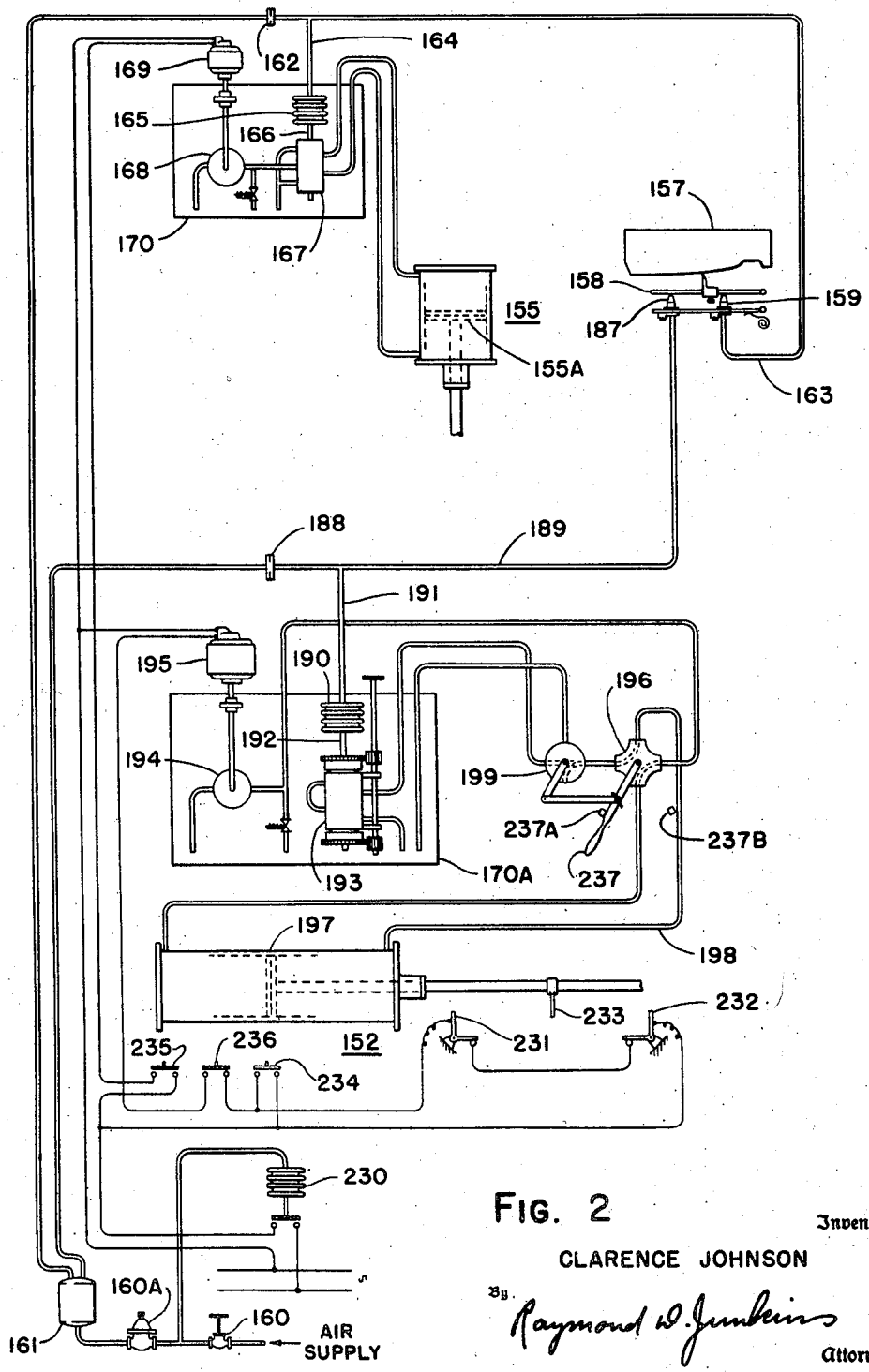
Fig. 2 illustrates diagrammatically the various circuits employed in the embodiment of my invention shown in Fig. 1.

Referring to Figs. 1 and 2, the carriage 151 is arranged to be positioned longitudinally along the lathe 150 by a servo-motor 152 having a piston rod 153 operatively connected to the carriage. A cross-slide 154 mounted on the carriage 151 is positioned transversely by means of a similar servo-motor 155 secured to and movable with the carriage 151. In the embodiment of my invention illustrated in Fig. 1 the tool 154A carried by the cross-slide 154 is positioned to form a work piece 156 to conform with the shape of a pattern or template 157.

As the carriage 151 is positioned along the lathe by the servo-motor 152 transverse changes in the profile of the pattern 157 effect corresponding changes in the relative positions of a pivoted follower or feeler 158 and nozzle 159. The nozzle 159 is supplied with fluid under pressure, such as compressed air, from a source (not shown), through a shut-off valve 160, a reducing valve 160A, a stabilizing volume tank 161 and a suitable resistance such as an orifice 162. Compressed air is continuously discharged through the nozzle 159 to the atmosphere and changes in the position of the feeler 158 relative to the nozzle 159 cause changes in the pressure within the pipe 163 connecting the nozzle 159 to the orifice 162. Variations in pressure within the pipe 163 are transmitted through a pipe 164 to an expansible contractible chamber such as a bellows 165 positioning the movable valve member 166 of a pilot valve 167. The pilot valve 167 controls the flow of hydraulic fluid to and from a servo-motor 155.

When the profile of the pattern 157 is parallel to the line of travel of the carriage 151 a certain distance will exist between the nozzle 159 and feeler 158. When this distance, which for convenience I call the "normal distance," exists a sufficient pressure is maintained within the bellows 165 to hold the movable valve member 166 in a neutral position so that hydraulic fluid is transmitted neither to nor from the servo-motor 155 and the cross-slide 154 remains stationary relative to the carriage 151. Assuming however by way of example that the feeler 158 moves toward the nozzle 159, the pressure within the pipe 163 and that transmitted to the bellows 165 will increase proportionately. Such increase in pressure will cause the servo-motor 155 to position the cross-slide 154 so that the nozzle 159 carried thereby moves away from the feeler 158 until normal distance is restored therebetween. The tool 154A also carried by the cross-slide 154 will be moved relative to the work piece 156 a corresponding amount, and hence the latter will be formed to the exact configuration of the pattern or template 157. Hydraulic fluid, such as oil, is supplied the pilot 167 by means of a pump 168 driven by a motor 169.

In mechanisms of the type described, it is desirable to modify the rate of relative movement of tool and work piece in one direction whenever a relative movement of the tool and work piece in a second direction is required. Thus in the embodiment of my invention illustrated in Figs. 1 and 2 upon any change in shape of the pattern 157 requiring a transverse movement of the tool 154A the rate of travel of the carriage 151 along the lathe should be decreased so that the shape of the work piece 156 will closely conform to the shape of the pattern. To accomplish this I show the servo-motor 152 controlled by a control couple comprising the feeler 158 and a nozzle 187. So long as the profile of the pattern 157 is parallel to the line of travel of the carriage 151 the normal distance is maintained between the feeler 158 and nozzle 187 so that the servo-motor 152 moves the carriage 151 at any desired maximum rate of speed. However, upon a change in the profile of the pattern 157 the feeler 158 will move toward or away from the nozzle 187, thereby changing the loading pressure established by the latter and acting to slow down the rate of travel of the carriage 151. Thus it may be said that the control couple comprising the feeler 158 and nozzle 187 acts to limit the maximum departure of the work piece 156 from the shape of the pattern 157. Upon a predetermined departure of the relative position of the feeler 158 and nozzle 187 from normal the system disclosed will stop the carriage 151, thereby permitting the tool 154A to be positioned transversely of the axis of the lathe until such normal is reestablished. Preferably and by means hereinafter to be described, the relative positions of the nozzles 159 and 187 are adjustable so that the maximum tolerance between the shape of the work piece 156 and pattern 157 may be brought within any desired limits. Thus the positioning of the nozzle 187 to the left, as shown in Fig. 1, will cause a greater change in air loading pressure for a given change in the profile of pattern 157, and thereby cause a greater change in the rate of travel of the carriage 151.

Referring now particularly to Fig. 2, compressed air is supplied to nozzle 187 through an orifice 188 and pipe 189. Variations in pressure within the pipe 189 caused by changes in the relative positions of feeler 158 and nozzle 187 are transmitted to an expansible contractible bellows 190 through the pipe 191. Changes in pressure within the bellows 190 from that existing when the feeler 158 is the normal distance away from the nozzle 187 acts to position a valve member 192 of a pilot valve 193. The pilot valve 193 may be considered as a variable fluid resistance which acts to increase the resistance to fluid flow upon movement of the valve member 192 upwardly or downwardly from that position existing when the normal pressure is effective within the bellows 190.

The servo-motor 152 is supplied with oil under pressure from a pump 194 driven by a motor 195. Conveniently the motor 194, pilot valve 193 and associated apparatus may be mounted upon and within a housing 170A.

The oil after leaving the pump 194 passes through a four-way valve 196, and thence to the servo-motor 152 on one side of the piston 197. As the piston 197 is positioned to the right, as shown in Fig. 2, by the oil from the pump 194, oil is discharged from the servo-motor 152 through a conduit 198, the four-way valve 196, thence through a three-way valve 199 to the pilot valve or variable resistance 193, whence it is discharged into the reservoir formed by the housing 170A. It will be noted that the full pressure developed by the pump 194 is effective for positioning the piston 197. The rate of travel thereof and accordingly of the carriage 151 is varied, however, by variably throttling the discharge of oil by means of the pilot valve or fluid resistance 193.

In the embodiment of my invention shown in Figs. 1 and 2, I provide various safety and other devices for facilitating operation. Thus I show connected in the power supply to motors 169, 195 an air pressure failure switch 230 which prevents their operation unless air pressure is available for the nozzles 159, 187. Also shown connected in circuit with motor 195 are limit switches 231 and 232 arranged to be operated by a projection 233 carried by the piston rod of servo-motor 152. The switches may be adjusted so that upon the tool reaching either end of pattern 157 motor 195 is deenergized, thereby preventing further travel of the carriage which might result in damage to the tool or other parts of the lathe. A push button station 234 allows the operator to reenergize motor 195 after the power supply thereto is broken either at switch 231 or 232. Also connected in circuit with motors 169 and 195 are manually operable push buttons 235 and 236 respectively, which affords the operator instantaneous control over the transverse or longitudinal feed of the tool 154A.

As shown in Fig. 1 the tool 154A is arranged to traverse the work piece 156 from left to right. Upon the tool reaching the end of the work piece motor 195 will be deenergized as heretofore described by switch 232 opening. The tool 154A can then be moved transversely away from the work piece 156 by the nozzle 159 and feeler 158 being manually moved relative to each other, thereby causing the servo-motor 155 to position the cross-slide in proper direction. In order that the tool 154A may be returned to the left end of its travel I provide a hand operable lever 237 for simultaneously operating the four way valve 196 and three-way valve 199. Thus upon the tool 154A reaching the right end of its travel, switch 231 will open, deenergizing motor 195. The operator would then relatively move feeler 158 and nozzle 159 so that the tool is positioned away from the work. Lever 237 would then be shifted from stop 237A to 237B and simultaneously the circuit to motor 195 closed by means of push button 234. Shifting of lever 237, as shown in Fig. 2, causes pipe 198 to be connected to pump 194 while the connection to servo-motor 152 at the opposite side of piston 197 is connected directly to the oil reservoir formed by housing 170A through three-way valve 199. As full pressure developed by the pump 194 is available for positioning the piston 197 in reverse direction, and by virtue of the fact that the pilot valve 193 is by-passed, the reverse traverse will be made at a high speed.

In the event that it is desired to have the tool 154A feed in the reverse direction, that is from left to right, then by disconnecting the lever 237 at 237C from the three-way valve 199 so that movement of the lever adjusts only the four-way valve 196, then the pump 194 will deliver pressure fluid through the pipe 198 to the servo-motor 152, whereas the cylinder of servo-motor 152 on the opposite side of piston 197 will be connected to the pilot valve 193. Accordingly, with such an arrangement the operation will be as previously described, except that the tool 154A will feed from right to left as viewed in Fig. 1 rather than from left to right.

Figure 3:
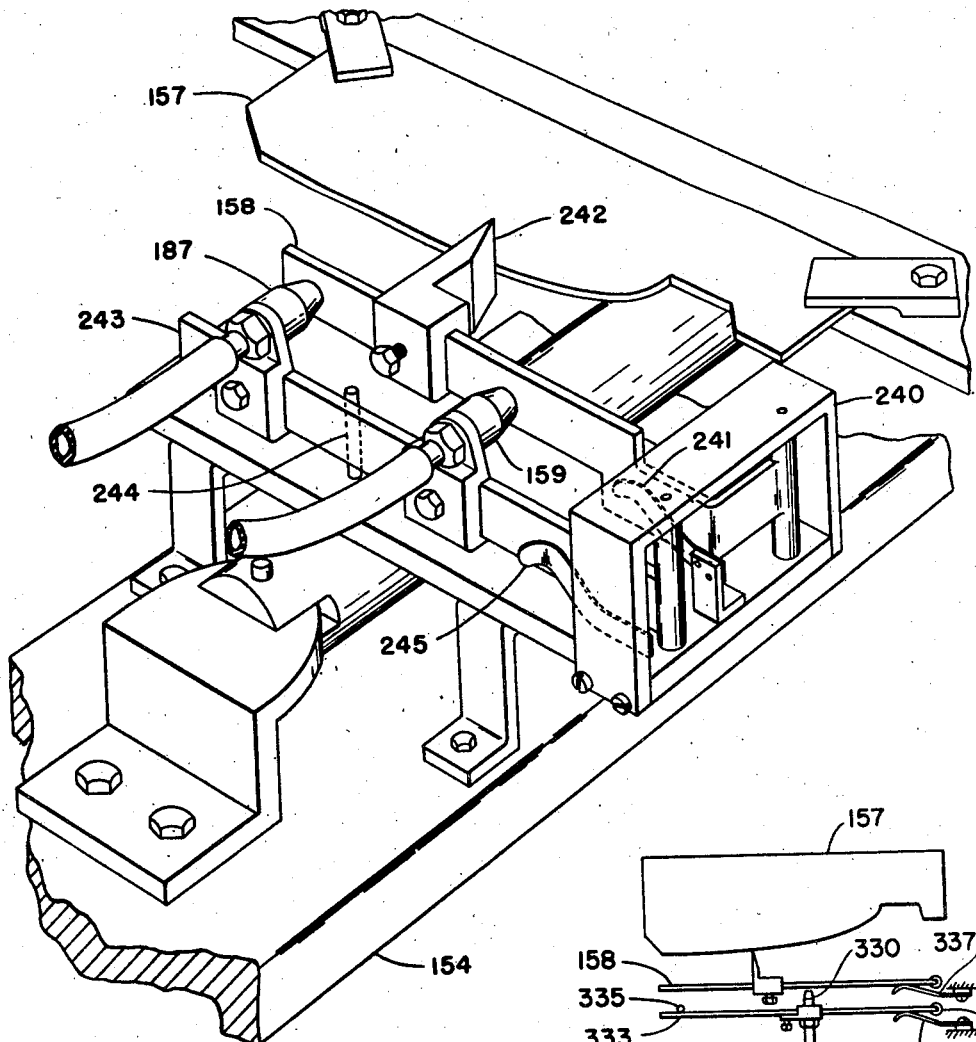
Fig. 3 illustrates to larger size and in greater detail the tracer mechanism shown in Fig. 1.

In Fig. 3 I show to larger size and in greater detail the tracer mechanism illustrated in somewhat diagrammatic fashion in Fig. 1 as being comprised essentially of the feeler 158 and nozzles 159 and 187. Referring to Fig. 3, the feeler 158 is pivotally mounted in a bracket 240 supported on the cross-slide 154. The feeler is urged in a clockwise direction by a spring 241 and carries a projection 242 of essentially the same shape as the tool 154A, which bears against the pattern 157. Nozzles 159 and 187 are adjustably mounted on a bar 243 pivotally mounted in bracket 240, and urged against a stop 244 by a spring 245. Transverse depressions in the pattern or template 157 cause the feeler 158 to move away from the nozzles 159 and 187, whereas transverse rises therein cause the feeler 158 to move toward the nozzles 159 and 187.

By having the nozzles 159 and 187 adjustable, the speed with which the carriage 151 is positioned longitudinally along the lathe or the cross-slide 154 transversely thereof may be varied. Likewise having the nozzle 187 adjustable relative to the nozzle 159 permits the transverse speed of the cross-slide 154 to be varied relative to the longitudinal speed thereof. Such adjustment affords a ready means for conforming the operation of the tool to the profile of the particular pattern or template to be duplicated.

Figure 5:
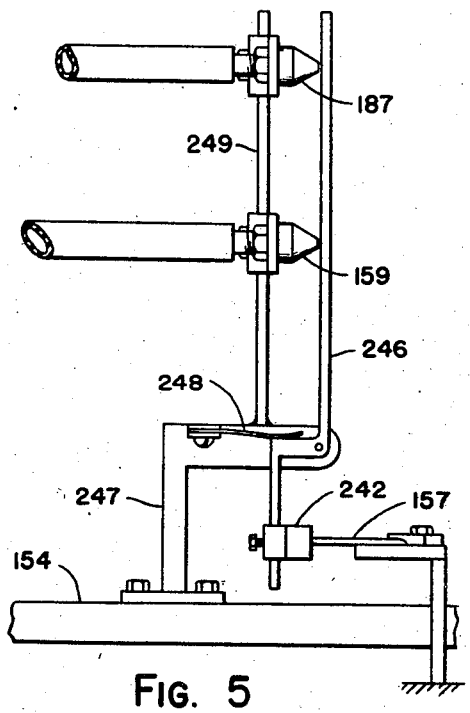
Fig. 5 illustrates a modified form of tracer mechanism.

In Fig. 5 I illustrate a modified form of tracer mechanism wherein a feeler 246 is pivotally mounted on a support 247 secured to the cross-slide 154. The feeler 246 is urged in a counter-clockwise direction by a spring 248 so that the projection 242 bears against the pattern 157. Variations in the shape of the pattern 157 cause the feeler 246 to move toward or away from the nozzles 159 and 187, which control the operation of the carriage 151 and cross-slide 154 as heretofore described. The nozzles 159 and 187 are adjustably mounted on a vertical support 249 so that the longitudinal and transverse speeds of the tool 154A may be relatively varied.

Figure 6:
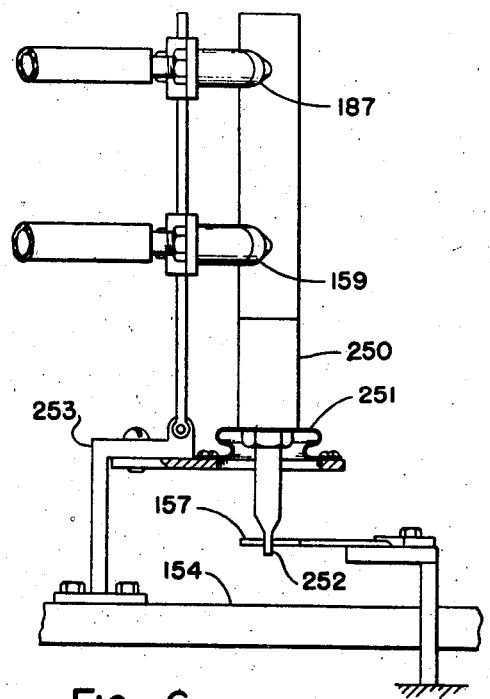
Figs. 6 and 7 are elevation and plan views respectively of another form of tracer mechanism.
Figure 7:
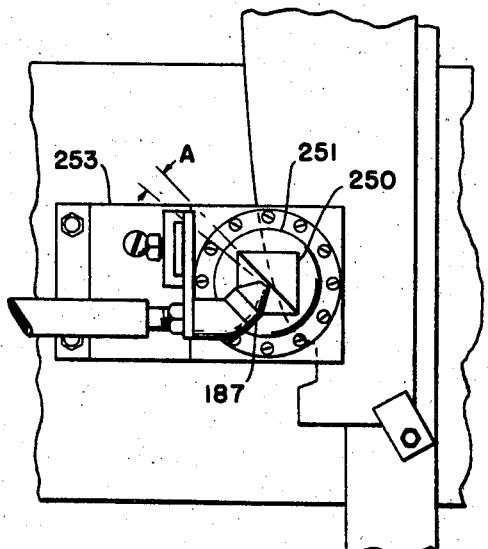

In Fig. 6 I show in elevation and in Fig. 7 in plan view a further modified form of tracer mechanism. Therein a feeler 250 is vertically mounted in a flexible diaphragm 251 and has a projection 252 adapted to bear against the pattern 157. The diaphragm 251 is secured to a support 253 mounted on the cross-slide 154. As the projection 252 is oscillated in any direction in following the contour of the cam 157 the feeler 250 is correspondingly oscillated toward or away from the nozzles 159, 187, thereby controlling the movement of the tool 154A as heretofore described. Preferably the face of the feeler 250 adjacent the nozzles 159 and 187 is disposed at an angle to the longitudinal and transverse motion of the cross-slide 154 as shown more clearly in Fig. 7. Likewise the face of the feeler 250 lies in a plane at an angle to the plane of the nozzles 159, 187 as indicated by A in Fig. 7. Such construction permits the feeler 250 to accurately control the operation of the cross-slide notwithstanding that the pattern 157 has a profile edge at right angles to the longitudinal axis of the lathe. In other words, the construction shown makes it possible for the feeler 250 to move toward or away from the nozzles 159 and 187 when the projection 252 is moving at right angles to the line of movement of the carriage 151 in following the profile of the pattern.

Initially, with the tracer construction shown in Figs. 6 and 7, the feeler 250 is adjusted relative to the nozzles 159 and 187 so that the inherent resiliency of the flexible diaphragm 251 urges the extension 252 toward the pattern. Upon the projection 252 reaching a declivity in the pattern the tracer 250 will move toward the nozzles 159 and 187, whereas upon the extension 252 meeting a projection the tracer 250 will move away from the nozzles 259 and 187.

Figure 8:
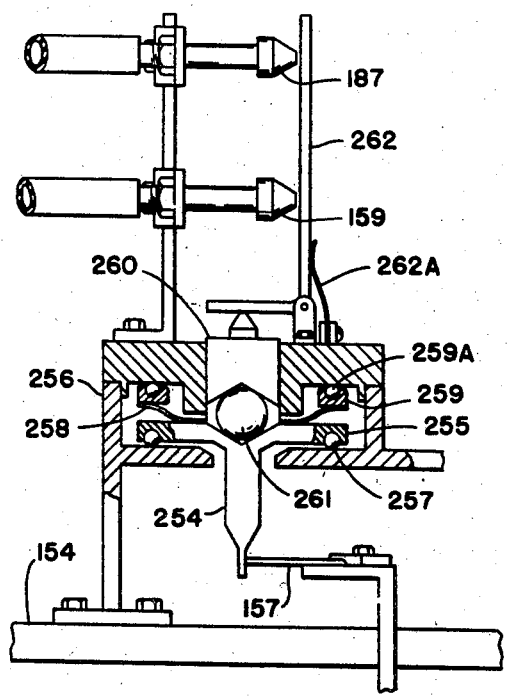
Fig. 8 illustrates a further modified form of tracer mechanism.

In Fig. 8 I show a further modified form of tracer mechanism. In this construction a feeler 254 engages the pattern 157 and has a laterally extending flange 255 disposed within a housing 256. The flange 255 has a circular groove forming a ball race in which are disposed ball bearings 257. The flange 255 is urged downwardly against the lower face of the housing by spring members 258 carrying at their outer extremities a ball race 259 carrying ball bearings 259A bearing against the upper face of the housing 256.

The feeler 254 is movable in any direction in a horizontal plane by changes in the profile of the pattern 157. Such horizontal movements are translated into corresponding vertical movements of a plunger 260 through a ball 261 disposed in mating conical recesses in the feeler 254 and plunger 260. Vertical movements of the plunger 260 oscillate a bell crank 262 toward and away from the nozzles 159 and 187 to thereby control the longitudinal and transverse movements of the tool 154A.

The tracer mechanism shown in Fig. 8 is initially adjusted so that the apex of the conical recess in the feeler 254 is offset from the apex of the conical recess in the plunger 260 when normal distance exists between the nozzles 159, 187 and bell crank 262. The apexes of the two conical recesses are urged toward alignment however by a spring 262A bearing against the bell crank 262. Such downward urging of the plunger 260 also urges the feeler 254 against the pattern 157, so that a declivity in the pattern causes the bell crank 262, for example, to approach the nozzles 159 and 187, whereas a projection causes it to recede therefrom.

In the embodiments of my invention so far described, wherein I control the relative movements of tool and work piece along two related paths, I have provided a separate nozzle for controlling the movement along each path. As I have pointed out, such construction affords a maximum flexibility in that the mechanism is readily adjustable so that the work piece may be made to conform to the pattern or template within any desired tolerances. In some instances, however, it may be preferable to employ a single nozzle which will control the relative movements of the tool and work piece along the two related paths simultaneously, and in Fig. 4 I show such a construction which may be incorporated in the various embodiments of my invention I have shown and described.

Figure 4:
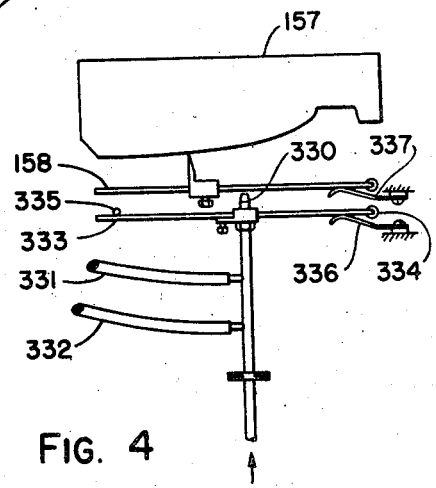
Fig. 4 illustrates an alternate arrangement of tracer and nozzle mechanism which may be incorporated in the various embodiments of my invention.

Referring to Fig. 4, the feeler 158 is arranged to traverse the pattern 157 as the tool 154A, for example, traverses the work piece 156. Movements of the feeler 158 toward and away from a nozzle 330 through which air is continuously discharged to the atmosphere, produce corresponding variations in pressure in the pipes 331 and 332. As described with reference to the embodiment of my invention illustrated in Fig. 1, for example, pressure variations in the pipe 332 may control the servo-motor 152 regulating the rate of travel of the carriage 151, and variations in pressure within pipe 331 may control the servo-motor 155 regulating transverse movements of the cross-slide 154. It will be evident to those familiar with the art that the modification shown in Fig. 4 may equally as well be applied to the other embodiment of my invention previously described.

The nozzle 330 is shown as being adjustable along a bar 333 pivoted at 334 and urged against a suitable stop 335 by a spring 336. The feeler 158 is likewise urged toward the pattern 157 by a spring 337. Such adjustment makes it possible to vary the change in longitudinal rate of travel and simultaneously the transverse feed of the tool for a given change in shape of pattern 157.

In general, and referring particularly for explanation to Fig. 3, the nozzles 159 and 187 are connected to a suitable source of pressure fluid, such as compressed air, by flexible tubes or other pipes in which are inserted orifices or restrictions. Considering either one of the nozzles alone, normally there is a jet of fluid continuously discharged from the nozzle against the member 158 which acts as a valve member for the port in movement toward and away from the port governing the rate of discharge of fluid therefrom. That is to say when the follower 158 is positioned in a counterclockwise direction, as for example when the feeler 242 encounters a rise in the template 157, the follower 158 is positioned closer to the port 187 and the rate of discharge from the port is decreased. Conversely when a depression in the template 157 is encountered by the feeler or tracer edge 242 then the follower 158 is positioned in a clockwise direction and departs from the end of the nozzle 187, thereby increasing the rate of flow of fluid (air) from the nozzle 187. Such changes in the rate of discharge from the port or nozzle 187 effect corresponding changes in the pressure of the fluid within the nozzle, a decrease in the rate of discharge effecting an increase in the pressure of the fluid within the nozzle, whereas an increase in the rate of discharge effects a corresponding decrease in fluid pressure.

This application constitutes a division of my copending application Serial No. 384,375, filed March 21, 1941, now Patent No. 2,372,426, granted March 27, 1945, and is directed particularly to that portion of my invention constituting tracer mechanisms. Other features of my invention disclosed but not claimed herein are disclosed and claimed in said parent application or in other divisional applications copending.

In connection with the tracer mechanisms described herein I use certain terminology which is well understood in the art. For example, the portion 187 is spoken of as a nozzle from which a jet of fluid is discharged to the atmosphere. The opening of the nozzle is also referred to as a port. The nozzle in conjunction with the follower 158 I term a control couple and, of course, more common language would be to call the nozzle and follower a valve for the two coact to control the rate of discharge of fluid from the connected pipe. It will be appreciated that the invention relates to the apparatus disclosed irrespective of what particular terminology is used to describe the individual parts thereof. In general, it will be seen that the rate of discharge of fluid from the nozzle 187 is controlled by the distance of the follower 158 from the port of the nozzle and therefore by the change in position of the feeler 242 as it scans the profile of the template 157. Obviously, while I am referring particularly at the moment to the nozzle 187 and the follower 158, I am referring also in general to all of the rest of my disclosure where it encompasses a nozzle and follower, or similar couple. Furthermore, it will be appreciated that it is not necessary for the follower 158 to have a projection scanning the template 157, as there may be intermediary elements or there may be other assembly construction as disclosed.

On the premise that a constant fluid pressure is supplied to the nozzle 187 it will then be understood that any deviation in the rate of discharge from the nozzle will correspondingly be reflected in the back pressure or the pressure within the pipe between the nozzle 187 and the orifice 188 (for example) and thus within the pipe 191 and the bellows 190. Therefore, the bellows 190 will continually be sensitive to the pressure within the pipe 191, likewise sensitive to the pressure within the nozzle 187, and likewise sensitive to changes in the contour of the pattern or template 157.

If the profile of the template 157 is a straight line and is parallel to the axis of the rotating work piece 156, then the rate of discharge of fluid through the nozzle 187 is constant, the pressure within the pipe 191 and bellows 190 is steady, and the tool is moved longitudinally along the work piece at a uniform selected maximum rate of travel. At the same time the pressure within the nozzle 159 and bellows 165 is uniform or "normal," the piston 155A is stationary, and the tool is not moved transversely of the work piece.

If the profile of the template 157 is a straight line but is inclined toward or away from the center line or axis of the rotating work piece 156, then the tool will cut the work piece to a taper. The piston 155A will move the tool smoothly toward or away from the axis of the work piece at a speed depending upon the angle between the profile of the template and the axis of the work piece. The rate of speed of the tool in a longitudinal travel direction will be decreased from its "normal" or maximum speed and it will be decreased an amount depending upon the angle between the profile of the template and the axis of the work piece. In other words, as the taper becomes steeper then the speed of longitudinal travel of the tool decreases, and vice versa. If a right angle shoulder is encountered in the template then the longitudinal travel of the tool ceases.

The pattern or template has a shape corresponding to the desired path of movement of the tool to produce the desired finished work piece. By "corresponding" is meant that not only is the pattern or template the same shape as the desired work piece, either in greater or smaller proportion thereto; but also that the pattern or template may be in any desired distorted shape to compensate it for characteristics of the mechanism. While the pattern or template must correspond to the desired work piece, it is not necessarily identical in contour, and, therefore, the term "correspond" implies that the pattern or template is purposely designed to result in the desired contour of the work piece to be produced.

I use the terms contour, profile, shape and the like in a broad sense and not with any limiting distinction between the profile of a two-dimensional silhouette or the surface configuration of a body for example. In general, the pattern dictates the desired shape of the work piece. I use profile and contour interchangeably. The pattern has the desired shape, although not necessarily the exact shape.

For a further more detailed explanation of the construction and operational features of the relay 167 and of the fluid resistance 193, reference should be had to my parent application, Serial No. 384,375, and now Patenet No. 2,372,426, granted March 27, 1945, of which this present application is a division.

While in accordance with the patent statutes I have described certain embodiments of my invention, it is evident that such embodiments may be modified in many ways without departing from the spirit and scope of the invention. Such embodiments of my invention as I have chosen to describe should, therefore, be taken as merely illustrative and not as limiting.

What I claim as new and desire to secure by Letters Patent of the United States is:

1. A tracer mechanism for producing a control effect corresponding to the profile of a pattern, comprising, a housing, a feeler adapted to scan the profile of the pattern and mounted in said housing with capacity for lateral movement in any direction in one plane, means mounted in said housing arranged for axial movement and adapted to establish a control effect, means cooperating with said feeler and first means for translating a lateral movement of said feeler in any direction to an axial movement of said first means, and a nozzle discharging a pressure fluid to atmosphere, said axially positionable means arranged to vary the rate of discharge.

2. A tracer mechanism for producing a control effect corresponding to the profile of a pattern, comprising, a housing, a feeler adapted to scan the profile of the pattern and mounted in said housing with capacity for lateral movement in any direction in one plane, means mounted in said housing arranged for axial movement and adapted to establish a control effect, means cooperating with said feeler and first means for translating a lateral movement of said feeler in any direction to an axial movement of said first means, a nozzle mounted on said housing and discharging a pressure fluid to atmosphere, and a baffle for said nozzle pivotally mounted on said housing arranged to be positioned relative the nozzle by said axially positionable means for regulating the rate of discharge of pressure fluid from said nozzle in accordance with the profile of the pattern.

3. A tracer mechanism for machine tools and the like having a relatively movable tool and work piece, a pattern having a profile corresponding to the desired shape of the work piece, and control means for relatively moving the tool and work piece; comprising a tracer arm scanning the pattern as the tool traverses the work and universally movable in any direction in the plane of scanning of the pattern, and a member capable of movement along a single path as the result of movement of the tracer arm, said member by its position regulating the discharge of a pressure fluid to atmosphere.

4. A tracer mechanism for machine tools and the like having a relatively movable tool and work piece, a pattern having a profile corresponding to the desired shape of the work piece, and control means for relatively moving the tool and work piece; comprising a tracer arm scanning the pattern as the tool traverses the work and universally movable in any direction in the plane of scanning of the pattern, a member capable of movement along a single path as a result of movement of the tracer arm, a nozzle normally discharging fluid at a constant rate to the atmosphere, variations in said rate regulating the control means, and a baffle for the nozzle positioned by the member.

5. A tracer mechanism for machine tools and the like having a relatively movable tool and work piece, a pattern having a profile corresponding to the desired shape of the work piece, and control means for relatively moving the tool and work piece; comprising a tracer arm scanning the pattern as the tool traverses the work and universally movable in any direction in the plane of scanning of the pattern, a member capable of movement along a single path as a result of movement of the tracer arm, a valve normally discharging fluid at a constant rate to the atmosphere, variations in said rate regulating the control means, and a controller for the valve positioned by the member.

6. A tracer mechanism for machine tools and the like having a relatively movable tool and work piece, a pattern having a profile corresponding to the desired shape of the work piece and control means for relatively moving the tool and work piece; comprising support means, a tracer arm mounted on said support means, said tracer arm scanning the pattern as the tool traverses the work and arranged to move in any direction in a single plane, a flexible diaphragm mounting for the tracer arm intermediate the ends thereof, and a valve mounted on said support means, said valve normally discharging fluid at a constant rate to the atmosphere, variations in said rate regulating the control means, the end portion of the tracer arm remote from the pattern being disposed in the path of said discharge for regulating said valve.

7. A tracer mechanism for machine tools and the like having a relatively movable tool and work piece, a pattern having a profile corresponding to the desired shape of the work piece, and control means for relatively moving the tool and work piece; comprising support means, a tracer arm mounted on said support means, said tracer arm scanning the pattern as the tool traverses the work and arranged to move in any direction in a single plane, a flexible diaphragm mounting for the tracer arm intermediate the ends thereof, the flexible diaphragm being fastened to the tracer normal to the axis thereof and rigidly supported at its periphery on said support means, motion of each end of the tracer arm being in a space cone whose apex is the point of joining of the tracer arm axis with the plane of the diaphragm, and a valve mounted on said support means, said valve normally discharging fluid at a constant rate to the atmosphere, variations in said rate regulating the control means, the end portion of the tracer arm remote from the pattern being disposed in the path of said discharge for regulating said valve.

CLARENCE JOHNSON.

REFERENCES CITED

The following references are of record in the file of this patent:

UNITED STATES PATENTS

| Number | Name | Date |
|---|---|---|
| 2,007,507 | Steiner | July 9, 1935 |
| 1,004,088 | Scott | Sept. 26, 1911 |
| 1,952,231 | Anderson | Mar. 27, 1934 |
| 1,959,178 | Sassen | May 15, 1934 |
| 2,259,472 | Johnson | Oct. 21, 1941 |
| 2,331,817 | Turchan | Oct. 12, 1943 |
| 2,007,232 | Wall | July 9, 1935 |

FOREIGN PATENTS

| Number | Country | Date |
|---|---|---|
| 847,882 | France | July 10, 1939 |